March 10, 1931. C. E. MAYNARD 1,795,875
DEVICE FOR SPRAYING LATEX
Filed Feb. 23, 1927
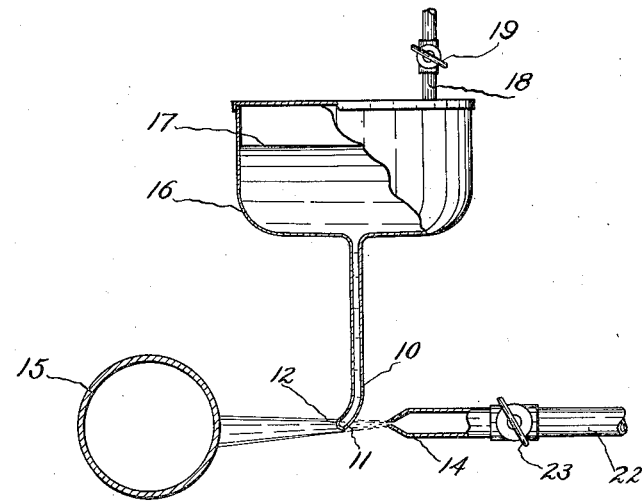
Fig. 1.
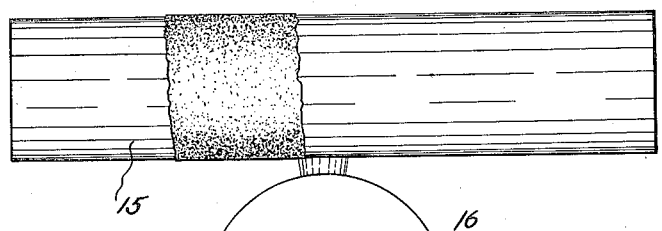
Fig. 2.
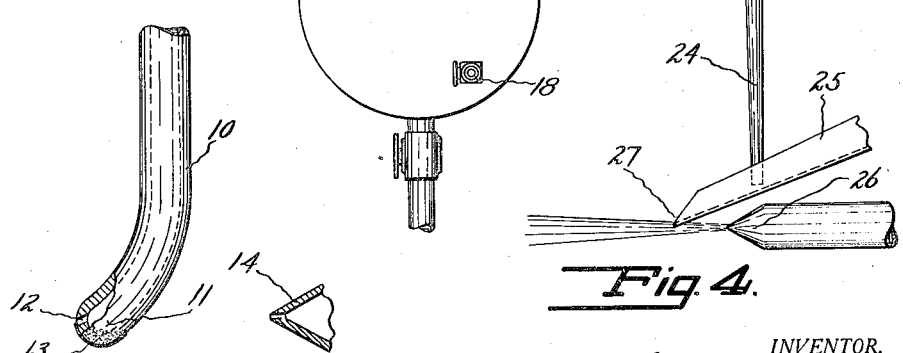
Fig. 3.
Fig. 4.
INVENTOR.
Charles Edgar Maynard
BY
Edward Taylor
ATTORNEY.

Patented Mar. 10, 1931

1,795,875

UNITED STATES PATENT OFFICE

CHARLES E. MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

DEVICE FOR SPRAYING LATEX

Application filed February 23, 1927. Serial No. 170,193.

This invention relates to an apparatus whereby latex or other rubber dispersions can be sprayed onto a form in the manufacture of rubber articles. It has for its object the provision of a spraying device which will operate continuously without plugging, which can be used intermittently without trouble due to the coagulation of the latex during the period when the spray is not being operated, and which will produce an even spray giving a smooth surface to the article.

Considerable difficulty has been experienced in the attempt to use sprays of the standard form with latex or other rubber dispersions. In the first place, due to the tendency of the rubber dispersion to coagulate great difficulty has been met with due to plugging of the spray while in use. This trouble is accentuated when the spray is used intermittently, as in this case there is a portion of the latex which is exposed to the air during the period when the spray is out of use and this portion coagulates and prevents re-starting of the spray. A further difficulty has been the production of a coarse spray which gave a roughly pebbled appearance to the article.

My invention will now be described in connection with the accompanying drawings, in which—

Fig. 1 is a side elevation of a spraying device constructed in accordance with my invention;

Fig. 2 is a top plan view thereof;

Fig. 3 is an enlarged detail of one form of spraying nozzle; and

Fig. 4 is a similar view of another form.

Referring first to the forms shown in Figs. 1, 2, and 3, latex is conducted to the spray by a nozzle 10. This is curved towards the work at the bottom end, terminating in a rounded tip 11. On the side of this tip toward the work is a hole 12 through which the latex runs from the interior of the nozzle forming on the bottom of the tip a film 13. This film is blown off the tip by air emerging from an air jet 14 and is blown against a mandrel 15, or other form upon which the work is to be built up, by the air jet.

Latex is supplied to the nozzle 10 from a vessel 16 in which the latex is kept at a constant level, indicated at 17. Any suitable method of maintaining this constant level may be used, but I have shown for illustration a pipe 18 through which the latex may flow, controlled by a valve 19 so that the flow into the vessel may be regulated to correspond with the flow through the nozzle. The latex runs continuously through the nozzle 10 even though the air jet is stopped, this preventing coagulation of the latex during the period of stoppage of the jet. That portion of the latex which runs out of the nozzle during the stoppage of the jet falls into a vessel 20 from which leads a pipe 21 by means of which the latex can be conducted back to the original source. The air line 22 which supplies the jet 14 is provided with a valve 23 so that the flow of air may be regulated or stopped.

A modified form of spraying device is shown in Fig. 4. In that case a nozzle 24, through which the latex flows, terminates at an intermediate point of a trough 25. An air jet 26 is directed so as to strike against the end of the trough, which is preferably pointed as indicated at 27. The latex which constantly flows out of the trough is blown off from this pointed end by the air jet in a fine spray.

The operation of the two forms of spraying device above described is generally similar. Instead of using the siphon-form of atomizing device which is in general use, the spraying device of my invention depends upon the constant formation and renewal of a film of latex upon a surface from which it is blown by an air jet. The latex flows over this surface constantly even when the air jet is discontinued, so that there is no time when stagnant latex would have an opportunity to coagulate or dry. The hole from which the latex emerges from the nozzle is in each case protected from the action of the air jet and is thus prevented from becoming plugged by evaporation or coagulation of the latex within it.

Having thus described my invention, I claim:

1. A device for spraying rubber latex which comprises a hollow tip through which the latex may pass, said tip having a curved and rounded end, an opening through the tip on the concave side thereof, and means for directing an air jet against the opposite side of the tip.

2. A device for spraying rubber latex which comprises a curved and rounded tip, means for presenting a film of latex continuously to the tip, means for directing an air jet against the tip so as to blow the latex therefrom in an atomized stream, and means for discontinuing the flow of air to stop the spray without discontinuing the flow of latex past the tip, whereby plugging of the tip by coagulating or drying of the liquid is avoided.

CHARLES E. MAYNARD.